(12) United States Patent
Lee

(10) Patent No.: US 6,880,934 B2
(45) Date of Patent: Apr. 19, 2005

(54) APPARATUS FOR ADJUSTING POSITION OF MIRROR IN PROJECTOR

(75) Inventor: Byung-Hee Lee, Kumi (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 10/343,124

(22) PCT Filed: Jul. 31, 2001

(86) PCT No.: PCT/KR01/01299

§ 371 (c)(1),
(2), (4) Date: Jan. 28, 2003

(87) PCT Pub. No.: WO02/12958

PCT Pub. Date: Feb. 14, 2002

(65) Prior Publication Data

US 2004/0027542 A1 Feb. 12, 2004

(30) Foreign Application Priority Data

Aug. 7, 2000 (KR) .......................................... 2000-45649

(51) Int. Cl.[7] .......................... G03B 21/00; G03B 21/26; G03B 21/14; G03B 21/28; G02B 5/08
(52) U.S. Cl. ............................ 353/31; 353/34; 353/38; 353/98; 353/69; 353/122; 359/862; 359/872
(58) Field of Search .............................. 353/31, 34, 38, 353/98, 69, 122; 359/838, 862, 872, 875, 881

(56) References Cited

U.S. PATENT DOCUMENTS

| | | | | |
|---|---|---|---|---|
| 5,283,599 A | * | 2/1994 | Tejima et al. | 353/30 |
| 5,418,586 A | | 5/1995 | Fujimori et al. | 353/122 |
| 5,988,818 A | * | 11/1999 | Fujimori et al. | 353/119 |
| 6,000,802 A | | 12/1999 | Hashizume et al. | 353/38 |
| 6,247,817 B1 | * | 6/2001 | Ogawa et al. | 353/38 |

FOREIGN PATENT DOCUMENTS

| | | |
|---|---|---|
| KR | 98-10574 | 5/1998 |
| KR | 99-17846 | 6/1999 |

* cited by examiner

Primary Examiner—Judy Nguyen
Assistant Examiner—Magda Cruz
(74) Attorney, Agent, or Firm—Fleshner & Kim, LLP

(57) ABSTRACT

Disclosed is an apparatus to adjust position of a mirror in projector. The mirror position adjusting apparatus includes a mirror, a mirror plate on which the mirror is seated, and a mirror mounting part located in the inside of the projector for adjusting the position of the mirror plate. The mirror position adjusting apparatus according to the present invention can adjust change in position of the mirror occurred due to transformation of plastic by a structure of the projector, which generates intense heat, thereby improving quality of image formed on a screen.

21 Claims, 4 Drawing Sheets

APPARATUS FOR ADJUSTING POSITION OF MIRROR IN PROJECTOR

TECHNICAL FIELD

The present invention relates to an apparatus for adjusting a position of a mirror in a projector, and more particularly, to an apparatus for adjusting a position of a mirror in a projector by modifying an installation structure of the mirror in a projector illuminating system.

BACKGROUD ART

Recently, as spread of personal computers has been increased, a demand for an LCD (Liquid Crystal Display) projector, which adopts an LCD as an image display panel, is on an increasing trend. The most important part for controlling an image quality in the LCD projector is an illuminating system of an optical engine part for diffusing and collecting light.

Referring to FIG. 1, the LCD projector illuminating system will be described as follows.

First, while light emitted from a lamp 1, which is a light source, passes first and second fly eye lenses 2 and 3, unnecessary ultraviolet ray is removed and distribution of luminous intensity becomes uniform.

Thereafter, light passing through the first and second fly eye lenses 2 and 3 is polarized through a beam splitter 4, and then collected through a first condensing lens 5.

A total reflection mirror 6 changes a progressive direction of the light passing the first condensing lens 5 and before entering into a first dichroic mirror 8 via a second condensing lens.

After that, a red part of the light that has entered into the first dichroic mirror 8 penetrates the first dichroic mirror 8 before being reflected by a red mirror 9 to change its progressive direction.

Meanwhile, green and blue parts of light entered into the first dichroic mirror 8 are reflected from the first dichroic mirror 8, and then enter a second dichroic mirror 10.

After that, the green part of light incident on the second dichroic mirror is reflected by the second dichroic mirror 10.

At the same time, the blue part of light, which has entered into the second dichroic mirror, penetrates the second dichroic mirror 10, and reflects through a first blue mirror 11 and a second blue mirror 12 in order before its progressive direction is changed.

After that, lights reflected through the red mirror 9, the second dichroic mirror 10 and the second blue mirror 12 are projected into a synthetic based part having LCD panels 13A, 13B and 13C to form various colors.

Additionally, the LCD projector illuminating system further includes a dichroic prism 14 for synthesizing light passing through the LCD panels 13A, 13B and 13C, and a projection lens 15 for projecting light synthesized in the dichroic prism 14.

In such LCD projector illuminating system, since the progressive direction of the light incident on the dichroic prism 14 is determined by the red mirror 9 and the second blue mirror 12, it is important to set the position of the red mirror 9 and the second blue mirror 12 properly.

However, in a conventional LCD projector illuminating system, the red mirror 9 and the second blue mirror 12 are placed in an optical case, which is an injection-molded material, in which the position cannot be changed.

Therefore, the conventional LCD projector illuminating system cannot adjust the position of the red mirror 9 and the second blue mirror 12 even though the position of the red mirror 9 and the second blue mirror 12 are deviated due to transformation and contraction of the optical case after the optical case is injection-molded. As a result, the quality of image formed on a screen is deteriorated which is sometimes shown on a screen, for example, yellow color appears on the right and left contour parts of the screen. Moreover, the problem of not being able to adjust the illuminating system may even cause the production efficiency is be lowered.

DISCLOSURE OF INVENTION

Therefore, it is an object of the present invention to provide an apparatus for adjusting the position of a mirror in projector, which can easily adjust an illuminating system and improve quality of image and production efficiency by adjusting position of a red mirror and a second blue mirror through change of an installation structure of the red mirror and the second blue even though an optical case is transformed and contracted after the optical case is injection-molded.

To achieve the above object, the present invention provides an apparatus to adjust position of a mirror in projector including: a mirror located on an optical path of light generated from a light source; a mirror plate having a vertical plate part, on which the mirror is seated, and a horizontal plate part bent from the vertical plate part, the horizontal plate part having a second coupling hole for adjusting a position of the mirror and a second position adjusting hole for adjusting the position of the mirror; and a mirror mounting part formed in an optical case at a portion where the mirror is mounted, the mirror mounting part having a mirror mounting surface for locating the vertical plate and a mirror supporting surface for locating the horizontal plate, the mirror supporting surface having a first coupling hole arranged with the second coupling hole and a first position adjusting hole arranged with the second position adjusting hole.

Furthermore, the present invention provides a method to adjust position of a mirror in projector including the steps of: loosening fixation between a mirror plate and a mirror mounting part on which a mirror is seated by first coupling means; adjusting a position of the mirror plate with second coupling means; and fixing the mirror plate and the mirror mounting part with the second coupling means.

BRIEF DESCRIPTION OF DRAWINGS

Further objects and advantages of the invention can be more fully understood from the following detailed description taken in conjunction with the accompanying drawing in which.

BEST MODE FOR CARRYING OUT THE INVENTION

Figure 1:
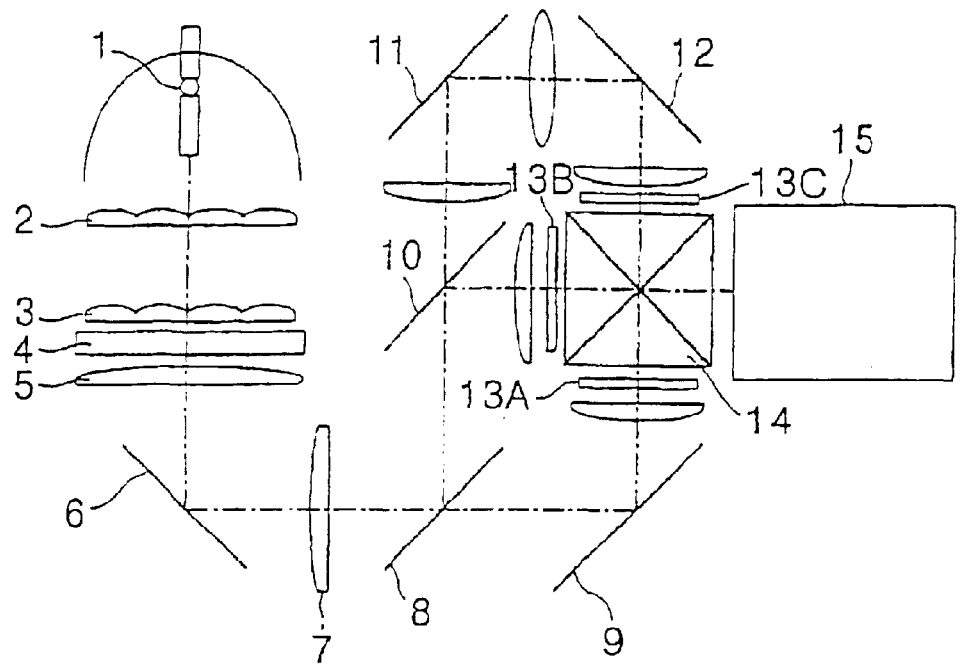
FIG. 1 is a brief view of a structure of a conventional LCD (Liquid Crystal Display) projector illuminating system.

The present invention will now be described in detail in connection with preferred embodiments with reference to the accompanying drawings. For references like reference characters designate corresponding parts throughout several views.

Figure 2:
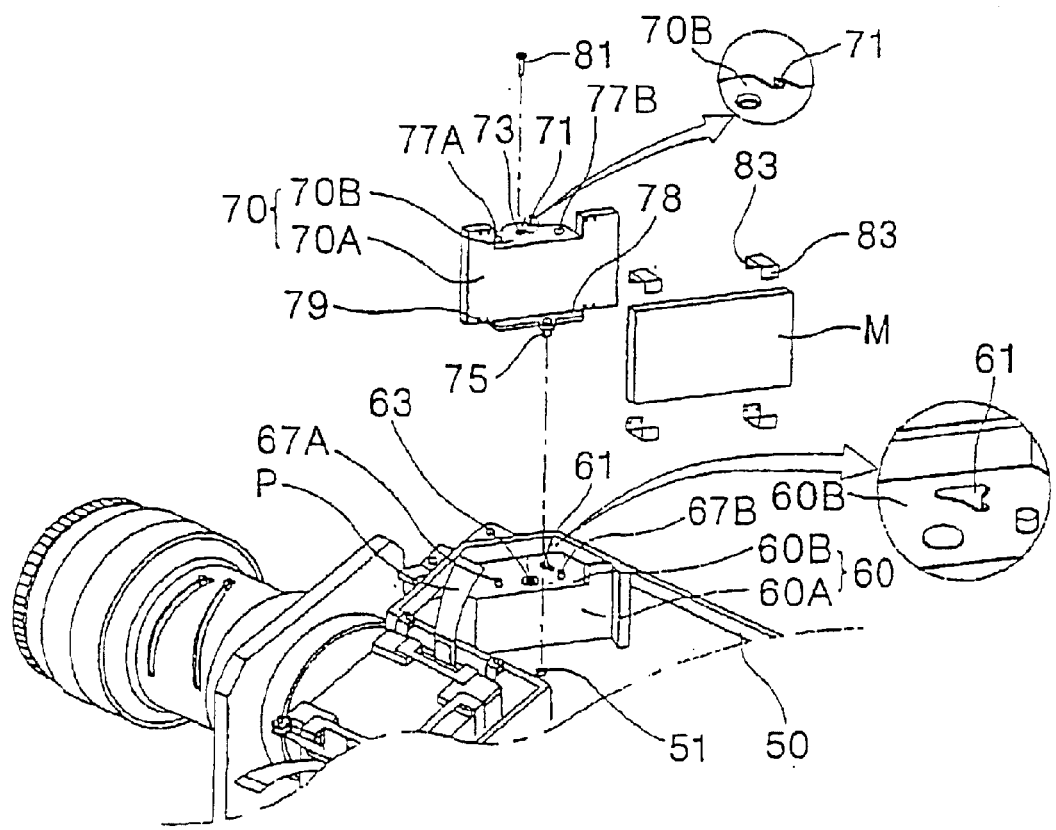
FIG. 2 is an exploded perspective view of an apparatus to adjust position of a mirror in projector according to the present invention.
Figure 3:
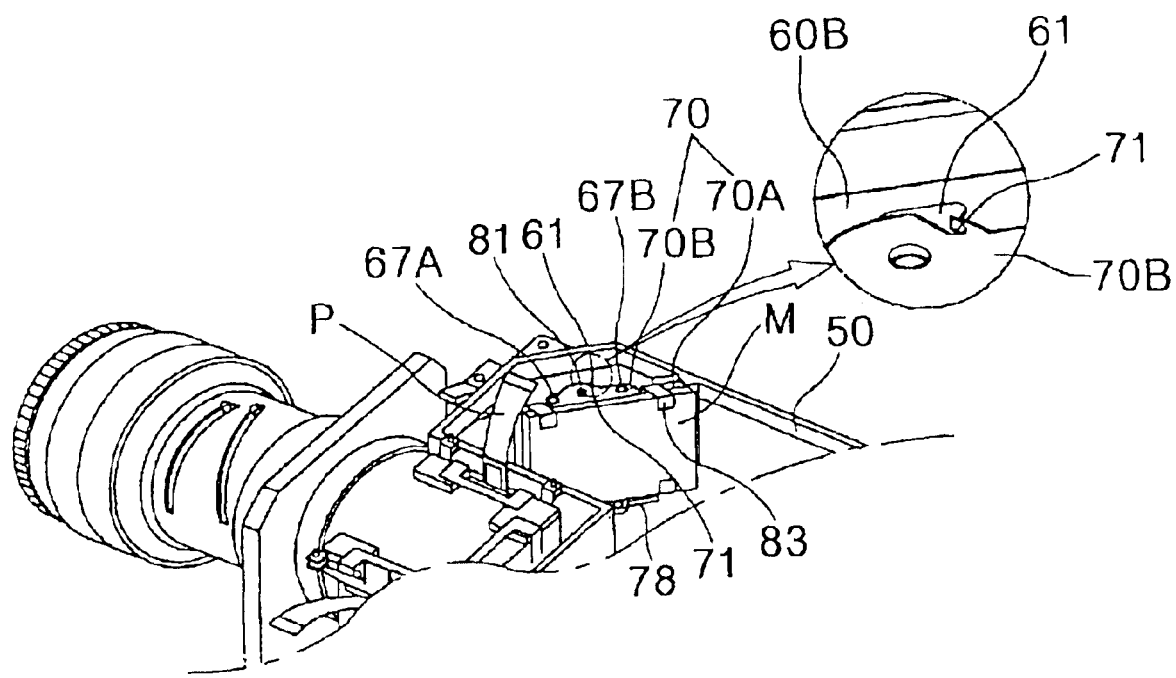
FIG. 3 is a perspective view of an assembled state of the apparatus to adjust position of a mirror in projector according to the present invention.
Figure 4:
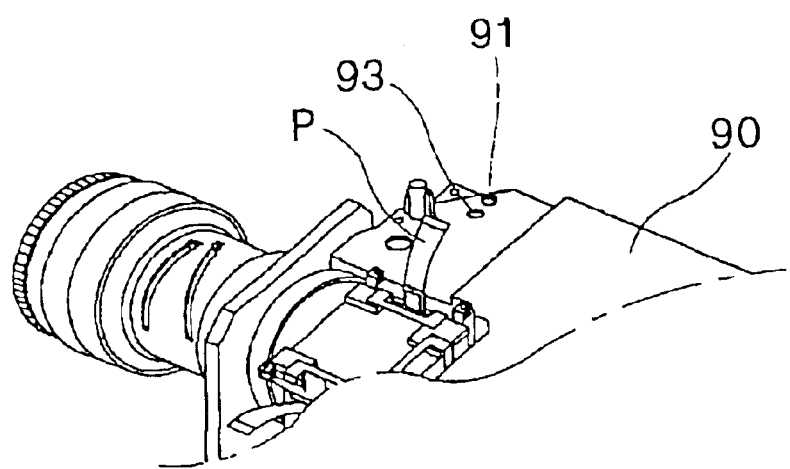
FIG. 4 is a perspective view showing a state that an optical case cover is covered to the state of FIG. 3.
Figure 5:
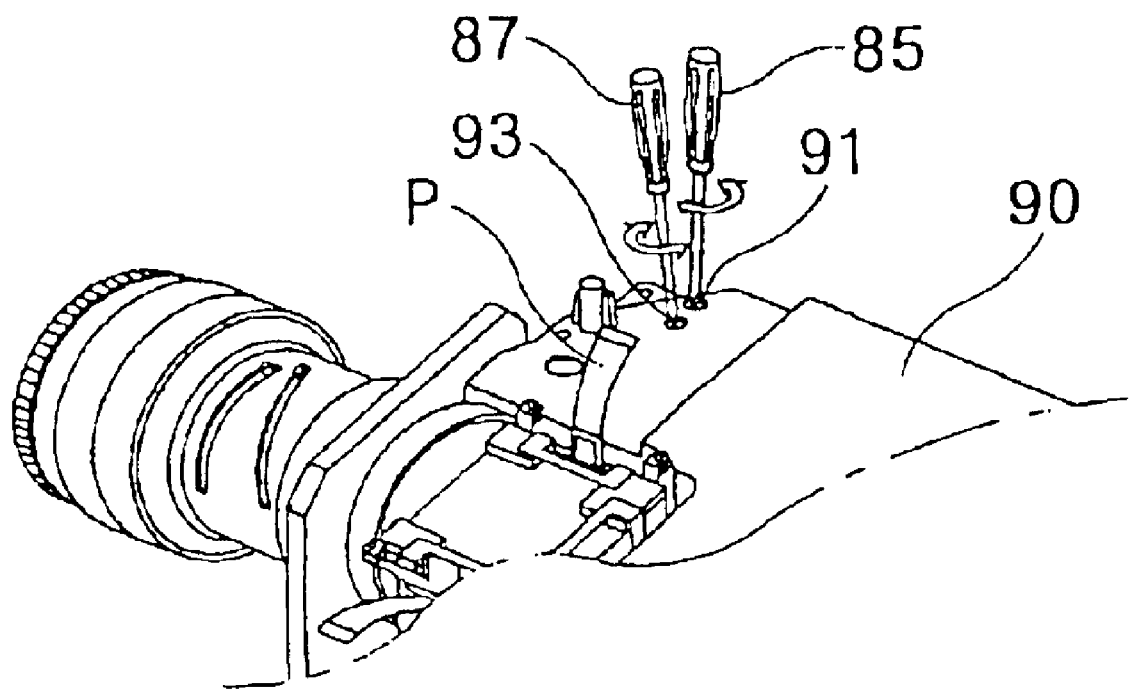
FIG. 5 is a perspective view showing state of adjusting the position of the mirror using a driver in the apparatus to adjust position of a mirror in projector.

FIG. 2 is an exploded perspective view of an apparatus for adjusting a position of a mirror in a projector according to the present invention, FIG. 3 is a perspective view showing an assembled state of the apparatus to adjust position of a mirror in a projector according to the present invention, FIG. 4 is a perspective view showing the state that an optical case cover is covered to the state of FIG. 3, and FIG. 5 is a perspective view showing s state of adjusting the position of the mirror using a driver in the apparatus to adjust position of a mirror in projector.

The apparatus for adjusting the position of the mirror in the projector in accordance with the present invention has an improved installation structure to allow adjustment of the position of the red mirror and the second blue mirror. As shown in FIGS. 2 and 3, the apparatus for adjusting the position of the mirror in the projector includes a mirror mounting part 60 formed at a predetermined position for mounting the mirror(M) of the optical case, and a mirror plate 70 mounted in a prescribed interval from the mirror mounting part 60 to adjust the position. The mirror(M) is attached to the side of the mirror plate 70.

Moreover, the mirror mounting part 60 has a mirror mounting surface 60A formed vertically and a mirror supporting surface 60B formed horizontally. A first position adjusting hole 61 for adjusting the position of the mirror plate 70 is formed on the mirror supporting surface 60B.

The mirror plate 70 includes a vertical plate part 70A in which the mirror is attached to is formed in correspond to the mirror mounting surface 60A, and a horizontal plate part 70B formed integrally to the vertical plate part 70A in correspond to the mirror supporting surface 60B and has a second position adjusting hole 71 corresponding to the first position adjusting hole 61 of the mirror supporting surface 60B. Meanwhile, the first position adjusting hole 61 is located beneath the second position adjusting hole 71. The first position adjusting hole 61 has a side in a straight line with the second position adjusting hole 71 and the other side widening gradually, and thus, a connecting tool inserted can move within the inside the first position adjusting hole 61.

Additionally, the mirror supporting surface 60B of the mirror mounting part 60 has a first screw coupling hole 63, and the horizontal plate part 70B of the mirror plate 70 has a second screw coupling hole 73 corresponding to the first screw coupling hole 63. If a fixing screw 81 is inserted into the first screw coupling hole 63 and the second screw coupling hole 73, the mirror plate 70 is fixed to the mirror mounting part. Meanwhile, since the fixing screw 81 is freely mounted and removed, the mirror plate 70 can be easily adjusted.

Moreover, the mirror plate 70 has a fixed projection 75 projecting toward a lower portion from a lower surface, and the optical case 50 has a fixing hole 51 corresponding to the fixed projection 75.

Additionally, it is preferable that the mirror position adjusting device is installed on an optical path before reaching a synthesizing system part to easily adjust the optical path through the mirror position adjusting device. Especially, in the adjustment of the optical path, it is preferable to apply the mirror position adjusting device to the red mirror and the second blue mirror.

According to another embodiment, the optical case 50 may have a fixed projection projecting upwardly from a bottom surface and the mirror plate 70 may have a fixing hole formed in a lower surface.

The fixed projection 75 serves as a center axis when the position of the mirror plate 70 is adjusted. That is, the mirror plate 70 can adjust gradient of the mirror(M) while rotating laterally around the fixed projection 75.

The mirror supporting surface 60B of the mirror mounting part 60 has first and second guide projections 67A and 67B projecting upwardly, and the horizontal plate part 70B has first and second guide holes 77A and 77B, in which the first and second guide projections 67A and 67B are inserted. A size of the first and second guide holes 77A and 77B is larger to the extent of a mirror position adjustable space than that of the first and second guide projections 67A and 67B.

Here, the first and second guide projections 67A and 67B have a round section respectively, and the first and second guide holes 77A and 77B have an oval section respectively. Thus, in case of adjusting the position of the mirror plate 70, the first and second guide projections 67A and 67B move along the first and second guide holes 77A and 77B respectively.

In a further preferred embodiment, the horizontal plate part 70B may have first and second guide projections projecting downwardly, and the mirror supporting surface 60B of the mirror mounting part 60 may have first and second guide holes.

Moreover, the vertical plate part 70A of the mirror plate 70 has a holder 78, on which the mirror(M) is put, formed at a lower end thereof for supporting the mirror(M).

The holder 78 is formed at an angle of 90 degrees to the vertical plate part 70A, and thus the mirror(M) supported by the holder 78 can stand vertically. If the mirror(M) is inclined, light emitted from a lamp and passes the mirror(M) cannot be exactly projected to an LCD (Liquid Crystal Display) panel of the synthesizing system part, and thus it is difficult to adjust the illuminating system. Therefore, it is very important that the holder 78 and the vertical plate part 70A are formed at the angle of 90 degrees.

Furthermore, the coupling means is in the form of a "⊏" character and includes four coupling clips 83 for contacting and coupling the mirror(M) to the mirror plate 70.

Additionally, in the vertical plate part 70A of the mirror plate 70, upper and lower ends, on which the mirror is not attached, have a pair of coupling projections 79 respectively, and each coupling clip 83 has a pair of coupling holes 83' at a side for inserting the coupling projections 83. Thus, by coupling the coupling projection 79 and the coupling hole 83', the coupling clips 83 are fixed to the mirror plate 70.

As shown in FIG. 4, the optical case cover 90 put on an upper portion of the optical case 50 includes a position adjusting hole 91 corresponding to the first and second position adjusting holes 61 and 71 and a screw coupling hole 93 corresponding to the first and second screw coupling holes 63 and 73, to adjust the position of the mirror plate 70 in a state that the optical case cover 90 covers the optical case. The second position adjusting hole 71 is in the form of a straight to smoothly adjust the position of the mirror through coupling means, such as a driver.

To assemble the mirror position adjusting device of the LCD projector illuminating system according to the present invention, the mirror is seated on the holder 78 of the mirror plate 70 and is fixed on the vertical plate part 70A of the mirror plate 70 using the four coupling clips 83.

When the mirror(M) is fixed on the mirror plate 70, the mirror plate 70 is positioned on the mirror mounting part 60 of the optical case 50. At this time, the fixed projection 75 of the mirror plate 70 is inserted into the fixing hole 51 formed at the bottom surface of the optical case 50 to serve as the central axis. The first and second guide projections 67A and 67B of the mirror mounting part 60 are inserted into the first and second guide holes 77A and 77B respectively to guide the mirror plate 70.

After that, when the mirror plate 70 is positioned on the mirror mounting part 60, the fixing screw 81 is temporarily assembled in the first screw coupling hole 63 of the mirror mounting part 60 and the second screw coupling hole 73 of the mirror plate 70 respectively.

When the mirror plate 70 is temporarily assembled to the mirror mounting part 60 through the fixing screw 81, the optical case cover 90 is covered on the upper portion of the optical cover 50. After that, as shown in FIG. 5, a straight driver 85 and a cross driver 87 are inserted into the position adjusting hole 91 and the screw coupling hole 93 formed in the optical case cover 90.

After that, the straight driver 85 is inserted into the first position adjusting hole 61 of the mirror mounting part 60 and the second position adjusting hole 71 of the mirror plate 70, and then the mirror plate 70 is rotated right and left using the straight driver 85 to adjust the mirror plate 70 into the optimal position. At this time, the mirror plate 70 is rotated right and left around the fixed projection.

When the adjustment of the mirror plate 70 is finished, the fixing screw 81 is firmly tightened using the cross driver 87 to prevent the fixing screw 81 from being loosened due to vibration.

Through the above process, the adjustment of the position, namely gradient, of the mirror(M) attached on the mirror plate 70 is finished.

Figure 6A:
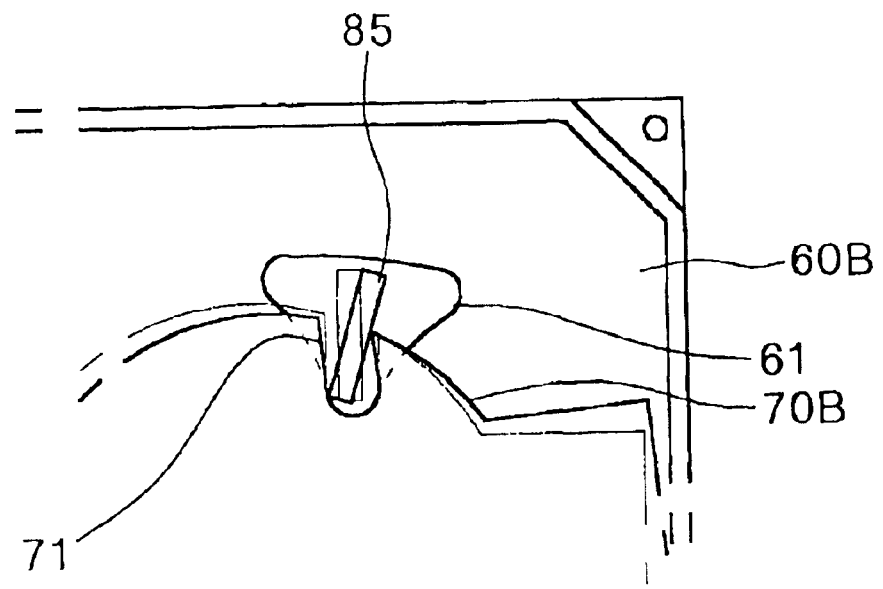
FIG. 6A is a plan view of a mirror position adjusting device in which a horizontal plate is rotated in a counter-clockwise direction.
Figure 6B:
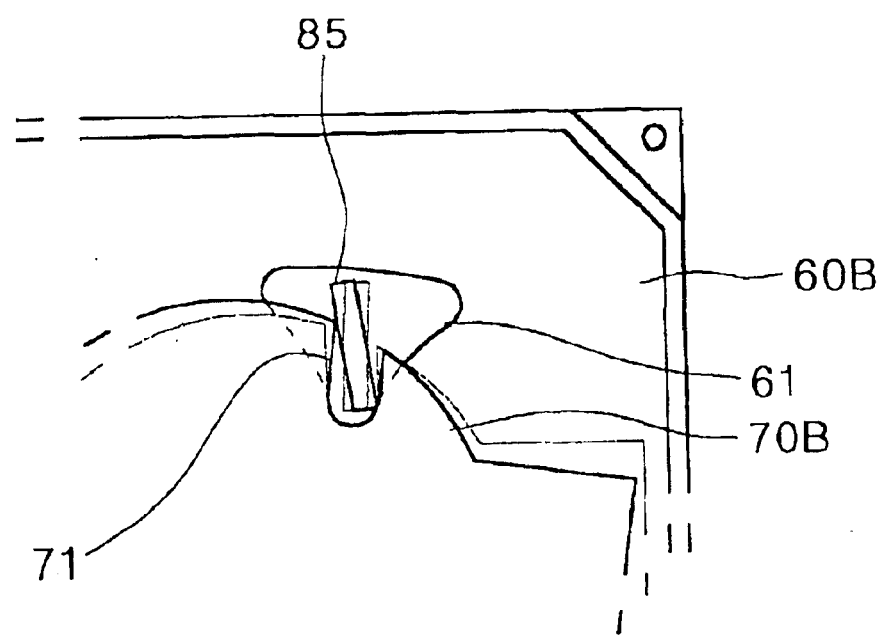
FIG. 6B is a plan view of a mirror position adjusting device in which the horizontal plate is rotated in a clockwise direction.

FIGS. 6A and 6B are plan views of the mirror position adjusting device, explaining the rotation of the mirror plate. Referring to the drawings, the adjustment of position of the mirror plate 70 will be described in more detail.

FIG. 6A illustrates a state that the horizontal plate 70B is rotated in a counterclockwise direction. If the straight driver 85 is rotated in a clockwise direction after being inserted into the first and second position adjusting holes 61 and 71, the straight driver 85 can freely move without movement of the mirror supporting surface 60B to the first position adjusting hole 61. However, an end of the straight driver 85 is engaged to the second position adjusting hole 71, and thereby the horizontal plate 70B is rotated in the counterclockwise direction. Therefore, a reflection angle of the mirror is adjusted.

FIG. 6B illustrates a state that the horizontal plate 70B is rotated in the clockwise direction. If the straight driver 85 is rotated in the counterclockwise direction after being inserted into the first and second position adjusting holes 61 and 71, the straight driver 85 can be freely moved without the movement of the mirror supporting surface 60B to the first position adjusting hole 61. However, the end of the straight driver 85 is engaged to the second position adjusting hole 71 and pushed, and thereby the horizontal plate 70B is rotated in the clockwise direction. Therefore, the reflection angle of the mirror is adjusted in a direction different from the direction of FIG. 6A.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

The mirror position adjusting apparatus according to the present invention can adjust change in position of the mirror occurred due to transformation of plastic by a structure of the projector, which generates intense heat, thereby improving quality of image formed on a screen.

What is claimed is:

1. An apparatus to adjust position of a mirror in projector, comprising:
    a mirror placed on an optical path of light generated from a light source;
    a mirror plate having a vertical plate part, on which the mirror is seated, and a horizontal plate part bent from the vertical plate part, and the horizontal plate part includes a second coupling hole for adjusting a position of the mirror and a second position adjusting hole for adjusting the position of the mirror; and
    a mirror mounting part formed in an optical case at a portion where the mirror is mounted, the mirror mounting part having a mirror mounting surface for locating the vertical plate and a mirror supporting surface for placing the horizontal plate, the mirror supporting surface having a first coupling hole arranged with the second coupling hole and a first position adjusting hole arranged with the second position adjusting hole.

2. The apparatus according to claim 1, wherein the mirror is installed on a straight optical path directly entering into a synthesizing system.

3. The apparatus according to claim 1, wherein the second position adjusting hole is a straight hole.

4. The apparatus according to claim 1, further comprising coupling members inserted to upper and lower ends of the mirror and the vertical plate part to put the mirror on the vertical plate part.

5. The apparatus according to claim 4, wherein the coupling members are coupling clips.

6. The apparatus according to claim 4, further comprising:
    a coupling projection formed on a surface of the vertical plate part contacting with the coupling member to firmly support the coupling member; and
    a coupling hole formed in the coupling projection and engaging the coupling projection.

7. The apparatus according to claim 1, further comprising:
    a fixed projection formed on a lower end of the vertical plate part to set the position of the mirror plate; and
    a fixing hole formed in the optical case corresponding to the fixed projection.

8. The apparatus according to claim 1, further comprising:
    a guide projection formed on the mirror supporting surface; and
    a guide hole in which the guide projection is inserted is larger than the guide projection to guide the movement of the mirror plate.

9. The apparatus according to claim 8, wherein two guide projections and two guide holes are formed.

10. The apparatus according to claim 8, wherein the guide hole is in the form of an oval extending to a movement direction of the mirror plate.

11. The apparatus according to claim 1, further comprising a holder extending at a right angle to a lower end of the vertical plate part for seating the mirror thereon.

12. The apparatus according to claim 1, wherein an optical case cover has a screw coupling hole and/or a position adjusting hole arranged with the second position adjusting hole and/or the second coupling hole in a row, the screw coupling hole/and or the position adjusting hole allowing coupling means to be inserted in a state that the optical case cover is not removed.

13. An apparatus to adjust position of a mirror in projector, comprising:

a mirror for adjusting an optical path in the inside of the projector;

a mirror plate having a vertical plate part on which the mirror is seated and a horizontal plate part which is bent from the vertical plate part and on which the mirror is put parallel, the horizontal plate part having a second screw coupling hole for fixing a position of the mirror and a second position adjusting hole for adjusting the position of the mirror;

a mirror mounting part formed in an optical case at a portion where the mirror is mounted, the mirror mounting part having a mirror mounting surface for locating the vertical plate parallel and a mirror supporting surface for locating the horizontal plate, the mirror supporting surface having a first screw coupling hole arranged with the second coupling hole in a row and a first position adjusting hole arranged with the second position adjusting hole; and a screw coupling hole and a position adjusting hole for a cover, the screw coupling hole and the position adjusting hole being formed in an optical case cover and fixing and adjusting a position of the mirror using coupling means, which contacts to the second screw coupling hole and the second position adjusting hole.

14. The apparatus according to claim 13, wherein the second position adjusting hole is depressed inwardly in a straight form at the horizontal plate part and the first position adjusting hole has a side arranged with the second position adjusting hole in a row and the other side widened gradually, and thereby the mirror mounting part is fixed but the mirror plate is moved when the coupling means is inserted and moved.

15. The apparatus according to claim 13, further comprising a screw freely inserted into the first and second screw coupling holes.

16. The apparatus according to claim 13, wherein the mirror is a red mirror and/or a second blue mirror.

17. The apparatus according to claim 13, wherein the coupling means is a driver.

18. The apparatus according to claim 13, wherein the member inserted into the first and second position adjusting holes is a straight driver.

19. A method to adjust position of a mirror in projector, comprising the steps of:

loosening fixation between a mirror plate and a mirror mounting part on which a mirror is seated by first coupling means;

adjusting a position of the mirror plate with second coupling means; and fixing the mirror plate and the mirror mounting part with the second coupling means.

20. The method according to claim 19, wherein the first and/or second coupling means adjust the position of the mirror by contacting to the inside of the projector through an optical case cover in a state that the optical case cover is mounted.

21. The method according to claim 19, wherein the second coupling means is a straight driver.

* * * * *